United States Patent
Disch-Simon et al.

(10) Patent No.: US 7,632,213 B2
(45) Date of Patent: Dec. 15, 2009

(54) GEAR-SHIFTING OPTIMIZATION METHOD AND CORRESPONDING CONTROL UNIT

(75) Inventors: Rainer Disch-Simon, St. Georgen (DE); Tobias Kalisch, Villingen-Schwenningen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 101 days.

(21) Appl. No.: 11/541,795

(22) Filed: Oct. 2, 2006

(65) Prior Publication Data

US 2007/0208480 A1 Sep. 6, 2007

Related U.S. Application Data

(63) Continuation of application No. PCT/EP2005/003078, filed on Mar. 23, 2005.

(30) Foreign Application Priority Data

Apr. 5, 2004 (DE) .................. 10 2004 017 794

(51) Int. Cl.
*B60W 10/04* (2006.01)
*B60W 10/00* (2006.01)
*F16H 59/30* (2006.01)
*G06F 19/00* (2006.01)

(52) U.S. Cl. .................. 477/115; 477/91; 477/124; 477/904; 701/58

(58) Field of Classification Search .................. 477/902, 477/904, 70, 90, 91, 97, 115, 116, 124; 74/335, 74/339; 701/58, 59, 60
See application file for complete search history.

(56) References Cited

U.S. PATENT DOCUMENTS

| | | | | |
|---|---|---|---|---|
| 4,847,767 A | * | 7/1989 | Carton et al. ............... | 701/67 |
| 4,911,031 A | * | 3/1990 | Yoshimura et al. ........... | 74/335 |
| 6,389,916 B1 | * | 5/2002 | Fukuda .................... | 74/335 |
| 6,997,075 B2 | * | 2/2006 | Serebrennikov et al. ....... | 74/339 |
| 7,246,535 B2 | * | 7/2007 | Berger et al. ............... | 74/335 |
| 2004/0063541 A1 | | 4/2004 | Berger et al. | |

FOREIGN PATENT DOCUMENTS

| | | |
|---|---|---|
| DE | 199 14 394 A1 | 6/2000 |
| EP | 0 310 387 A | 4/1989 |
| WO | WO 02/32713 A2 | 5/2002 |

* cited by examiner

*Primary Examiner*—Roger Pang
(74) *Attorney, Agent, or Firm*—Knobbe, Martens, Olson & Bear, LLP

(57) ABSTRACT

A method is disclosed for optimizing the gear-shifting sequence in a step-variable transmission fitted in a motor vehicle, in particular in an automated shift transmission, which has a plurality of gears, which can be engaged and disengaged by means of respective clutches, the method comprising the following steps: registering at least one of a tolerance-dependent and a wear-dependent parameter of a clutch of the step-variable transmission; and adjustment of a setpoint displacement value of a gear-shifting member of the clutch, which corresponds to the parameter and which is approached in the course of a gear shift, as a function of the value of the parameter registered.

5 Claims, 4 Drawing Sheets

GEAR-SHIFTING OPTIMIZATION METHOD AND CORRESPONDING CONTROL UNIT

CROSS-REFERENCE TO RELATED APPLICATIONS

This is a continuation application of International application PCT/EP2005/003078 filed on Mar. 23, 2005 which claims priority of German patent application DE 10 2004 017 794.5

BACKGROUND OF THE INVENTION

The present invention relates to a method for optimizing the gear-shifting sequences in a step-variable transmission, in particular an automated shift step-variable transmission for motor vehicles.

In automated shift transmissions (AST) the shift clutches of the step-variable transmission and a drive-away and disconnect clutch on the input side are operated by way of actuators. The actuators may be driven by an electric motor or fluidically driven, for example. The actuators are coordinated by a control unit. Gear changes may be initiated both manually and fully automatically according to an overriding gear shifting strategy.

The time taken to shift gear is particularly important in the case of ASTs, since a gear change is generally accompanied by an interruption or at least a reduction of the tractive force. In the case of an AST a gear change involves the disengagement of an initial gear or original gear and the engagement of a target gear.

The shift clutches (or simply clutches) used for engagement and disengagement of the gears primarily serve to produce a positively interlocking connection, which sets up the respective gear. The clutches frequently take the form of synchronizer clutches, which have a further function in that they serve for synchronizing the rotational speeds when engaging a gear. In a synchronizer clutch the synchronization point is represented by the position of a gear-shifting member of the synchronizer clutch at the commencement of the rotational speed matching. The synchronization position is the position on completion of the rotational speed matching.

The publication DE 101 10 898 A1 discloses a method for the commissioning of an AST. In this case the transmission parameters needed for selection and shifting are determined before fitting the step-variable transmission into a vehicle and are stored in a control unit. This is intended to have the advantage that the transmission parameters required for subsequent operation can be determined by means of external sensors prior to fitting, in order to compensate for standard deviations occurring in series production. This is also intended to lead to a high degree of accuracy in determining the synchronization positions of the individual gears. Transmission parameters are here taken to include the geometric data of the internal gear-shifting members of the transmission, the position of limit stops in the transmission etc.

For registering (detecting) the synchronization position of a synchronizer clutch in the known method the transmission input shaft is made to rotate by an external drive before the transmission is fitted. The synchronization position is then approached. The variation in the speed of the input shaft is monitored. Attainment of the synchronization point (referred to there as the synchronization position) is established when a variation in the rotational speed exceeds a predetermined threshold. Here a gearshift sleeve for the engagement of the relevant gear is to be actuated slowly and under a low force by the respective actuator.

Alternatively it is also possible to apply an input torque to the transmission input shaft and to monitor the output torque. Attainment of the synchronization point is established when a variation of the output torque exceeds a predetermined threshold.

DE 103 12 400 A1 further discloses an adjustment of the voltage of an electric motor used as actuator in running to the synchronization point, so that in running to the synchronization point at constant speed the precise synchronization force is achieved.

SUMMARY OF THE INVENTION

In this context the object of the present invention is to create an improved method for optimizing gear-shifting sequences of motor vehicle step-variable transmissions and a control unit that can be operated therewith.

This object is achieved by a method for the optimization of the gear-shifting sequence in a step-variable transmission fitted in a motor vehicle, particularly in an automated shift transmission, which has multiple gears, which can be engaged and disengaged by means of respective clutches, the method comprising the following steps:

registering of a tolerance-dependent and/or wear-dependent parameter of a clutch of the step-variable transmission, and adjustment of a set-point displacement value (target displacement value) of a gear-shifting member of the clutch, which corresponds to the parameter and which is approached in the course of a gear shift, as a function of the value of the parameter registered, and/or triggering of an event corresponding to the parameter.

The object is further achieved by a control unit for a drivetrain of a motor vehicle, the step-variable transmission being operated by a computer program, which is designed to perform the optimization method according to the invention.

The optimization method according to the invention makes it possible to optimize the gear-shifting sequences in a step-variable transmission already fitted in a motor vehicle. To do this, specific parameters of the gear-shifting sequence are registered whilst the motor vehicle is in operation, and specific set-point displacement values of the clutch are set or events triggered as a function of the parameter value registered.

The optimization method may be used continuously throughout the operating period. It is also possible, however to perform the optimization method or certain developments thereof just once or intermittently, that is to say in the context of routine servicing, for example.

In the method according to the invention the set-point displacement value adopted is adaptively adjusted throughout the operating time of the motor vehicle. This makes it possible to achieve an optimum timing and comfort of the gear shifts. It is also possible indirectly to determine the degree of wear of transmission components.

A gear shift may involve the disengagement of an initial gear, the engagement of a target gear, or both of these in the case of a gear change.

Although the method according to the invention is particularly intended for use in ASTs, it can also be applied to other types of transmission, such as dual-clutch transmissions, for example.

The gear-shifting member of the clutch is a member moved in a gear shift, in particular a gearshift sleeve or a member coupled to this such as a gearshift fork, a gearshift rod, an actuator output etc.

The triggering of an event corresponding to the parameter may be the starting of a program module in the course of the gear shift, for example.

The object is therefore achieved in full.

It is particularly advantageous if the clutch is a synchronizer clutch and the parameter is the synchronization point when engaging a gear.

This measure makes it possible, for example, to define a set-point displacement value for rapidly approaching the synchronization point just before the actual synchronization point. The time taken to shift gear can thereby be reduced, since it avoids the need for slow traversing of the gear-shifting member up to the synchronization point so as to prevent any sudden impact on approaching the synchronization point.

According to a further preferred embodiment the parameter is the disengagement point when disengaging a gear.

This makes it possible to trigger an event corresponding to the disengagement point immediately once the disengagement point is reached. In the prior art the gear is registered as disengaged only after a fixed displacement difference ($^{\Delta}$-position), the value of the displacement difference taking account of all tolerances and being relatively large. For safety reasons, when changing gear certain sequences can be initiated only once the initial gear is registered as disengaged. According to the invention the disengagement point in a step-variable transmission fitted in a vehicle is registered adaptively and can consequently serve to trigger other events (such as the "gear disengaged" message) immediately (or with a very much smaller displacement difference).

According to an alternative embodiment the parameter is the backing point when disengaging a gear.

As is well-known, so-called backings, which primarily serve to prevent accidental gear disengagement, are often provided on gearshift toothings. The backings are at a predefined distance from the disengagement point. When disengaging a gear the disengagement point can accordingly be determined directly through registering of the backing point. Here too, a corresponding event, such as the "gear disengaged" message or the initiation of further steps necessary in the course of a gear change, may be triggered on reaching the disengagement point.

It is on the whole particularly advantageous if the parameter is always reregistered throughout the service life of the motor vehicle.

The gear-shifting sequence can thereby be repeatedly optimized as a function of the variation in the parameter (due to wear, for example).

It is furthermore particularly advantageous if the parameter is registered whilst the motor vehicle is in motion.

In this way it is possible to take account not only of static but also of dynamic conditions. It is furthermore possible to constantly register parameters whilst in motion, in order to optimize the gear-shifting sequences.

Alternatively, it is naturally also possible to monitor the parameter intermittently throughout the life of the vehicle, during regularly recurring servicing work, for example, or whenever the vehicle is stationary.

According to a generally preferred embodiment the parameter is registered by moving the gear-shifting member and by registering the variation of the speed of the gear-shifting member.

Where the parameter is the synchronization point, the gear-shifting member is generally moved beyond the synchronization point, a differential speed on the clutch being necessary in this case. The gear-shifting member is preferably moved slowly (within minimal force) in the engagement direction. If the speed of the gear-shifting member falls, the current position of the gear-shifting member corresponds to the synchronization point.

Where the parameter is the disengagement point, this can be registered indirectly, for example, by way of the backing position. If the gearshift toothing of the clutch is provided with a backing, a change occurs in the speed of the gear-shifting member when this is moved in the neutral direction, that is to say at the backing position. For this it is essential that the gear to be disengaged be under torque.

According to a further preferred embodiment the parameter is registered by moving the gear-shifting member and registering the variation in the control variable of an actuator, which operates the gear-shifting member.

This embodiment basically corresponds to the method of registering the parameter using the variation in the speed of the gear-shifting member. If the parameter is the synchronization point, attainment of the synchronization point will cause the current (of an electromotive actuator) or the pressure (of a fluidic actuator) to rise due to the counterforce. This rise in the control variable occurs in the vicinity of the synchronization point. Again a differential speed on the clutch of the target gear is essential.

In disengaging a gear a corresponding brief increase in the current or pressure is to be detected when the backing of the clutch toothing is reached. The disengagement point can therefore be determined indirectly by way of the backing position.

According to further preferred embodiments the parameter is registered by moving the gear-shifting member and by registering the second derivative of the input speed of the step-variable transmission.

This method of registering the parameter presents itself when the clutch is opened after disengagement of the initial gear and the synchronization point has not yet been reached. The transmission input speed is determined by the drag torque of the transmission.

Instead of the transmission input speed it is also possible to use the differential speed between the input speed and the transmission output speed.

If the parameter is the synchronization point, the gradient of the transmission input speed varies when the synchronization point is reached. The variation in the speed curve is an indication of this. When shifting up, the speed gradient becomes steeper on reaching the synchronization point. The synchronization point can therefore be determined by way of the variation in the gradient of the transmission input speed (the second derivative). When changing down again, the speed diminishes steadily after disengagement of the initial gear, until the speed ceases to drop on reaching the synchronization point and begins to increase as the target speed is approached. In the process the sign of the speed gradient changes. However, the synchronization point lies where the gradient of the transmission input speed changes in value.

According to a further preferred embodiment the parameter is registered by moving the gear-shifting member and registering the input speed of the step-variable transmission.

Where the parameter is the synchronization point, this can be achieved by connecting the internal combustion engine of the motor vehicle to the transmission input shaft and running the gear-shifting member up to the set-point displacement value. On reaching the synchronization point a brief drop in the speed of the internal combustion engine can be detected.

Where the parameter is the disengagement point, a torque is superimposed on the gear to be engaged and the gearshifting member is moved in the neutral direction. As soon as the positive interlock is released, there is a variation in the transmission input speed.

This can accordingly also be registered through a variation in the control variable of the actuator.

According to the invention the detection of transmission parameters (such as the synchronization point or the disengagement point) may be used for the adaptive adjustment of a corresponding set-point displacement value. The set-point displacement value therefore takes account of the wearing of the synchronizer clutch or the like. Alternatively the registering of the parameter can also be used directly for triggering a corresponding event, such as the initiation of further steps in the method (in the manner of a software interrupt or the like).

It goes without saying that the parameter of the step-variable transmission is preferably a displacement parameter of the respective clutches of the step-variable transmission.

It is furthermore obvious that the optimization method according to the invention and the control unit according to the invention can equally be applied to other types of transmission, in particular also dual-clutch transmissions, in which gears are positively engaged through respective clutches.

It will be obvious that the aforementioned features and those yet to be explained below can be used not only in the respective combination specified but also in other combinations or singly, without departing from the scope of the present invention.

BRIEF DESCRIPTION OF THE SEVERAL VIEWS OF THE DRAWING

Exemplary embodiments of the invention are represented in the drawing and will be explained in more detail in the following description. In the drawing.

DETAILED DESCRIPTION OF THE INVENTION

Figure 1:
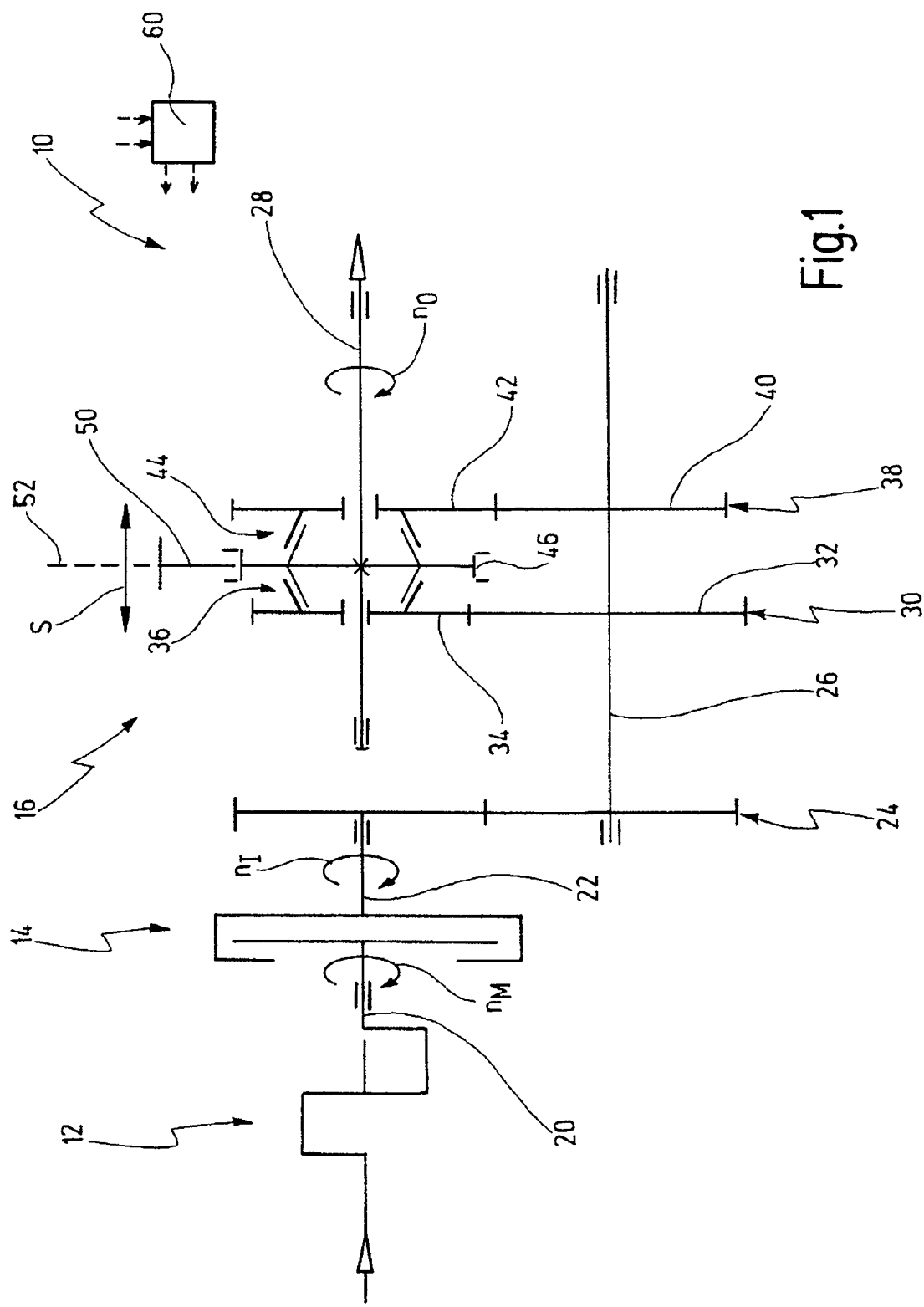
FIG. 1 shows a schematic representation of an automated shift transmission, in which the optimization method according to the invention and the control unit according to the invention can be used.

In FIG. 1 a drivetrain of a motor vehicle is generally denoted by 10.

The drivetrain 10 has an internal combustion engine 12, a drive-away and disconnect clutch 14 and a step-variable transmission 16.

An input member of the disconnect clutch 14 is connected to an engine output shaft 20. The speed of the engine output shaft 20 is denoted by $n_M$. An output member of the disconnect clutch 14 is connected to a transmission input shaft 22. The rotational speed of the transmission input shaft is denoted by $n_T$.

On the transmission input side the step-variable transmission 16 firstly has a constant-ratio gear train 24, which connects the transmission input shaft 28 to a countershaft 26.

The step-variable transmission 16 furthermore has a transmission output shaft 28, the rotational speed of which is denoted by $n_o$.

The step-variable transmission 16 furthermore comprises a plurality of gear trains corresponding to a plurality of gears that can be engaged by the step-variable transmission 16. In this case, for the sake of clarity, only two gear trains 30, 38 are shown, although the number of gears in typical drivetrains of the type shown is five, six, seven or more.

The first gear train 30 has a fixed gear 32 connected to the countershaft 26 and a loose gear 34 rotatably supported on the transmission output shaft 28. The loose gear 34 can be connected to the transmission output shaft 28 by means of a first clutch 36 (synchronizer clutch).

The second gear train 38 has a fixed gear 40 connected to the countershaft 26 and a second loose gear 42 rotatably supported on the transmission output shaft 28. The second loose gear 42 can be connected by means of a second clutch 44 to the transmission output shaft 28.

The clutches 36, 44 are integrated as a clutch assembly and can be operated by means of a gearshift sleeve 46, which is axially displaceable.

The gearshift sleeve 46 is operated by means of a gearshifting member 50, which may take the form, for example, of a gearshift fork or a gearshift oscillating link.

The drivetrain 10 shown is an automated drive train. The step-variable transmission 16 is an automated shift transmission. A control unit 60 is accordingly provided, which activates an actuator 52, which automatically operates the gearshifting member 50—and thereby the gearshift sleeve 46. The control unit 60 can obviously be equally well designed to automatically operate the disconnect clutch 14. An overriding control is furthermore generally provided, which also takes account of and influences parameters of the internal combustion engine 12.

In FIG. 1 the displacement of the gearshift sleeve 46 or the gear-shifting member 50 or the actuator 52 is denoted schematically by s.

The structure of the transmission shown is obviously only an example and is intended to illustrate the correlations in the optimization method according to the invention. The optimization method according to the invention can obviously be equally well applied to other types of drivetrains in which clutches are used for the engagement and disengagement of gears, such as dual-clutch transmissions.

Figure 2:
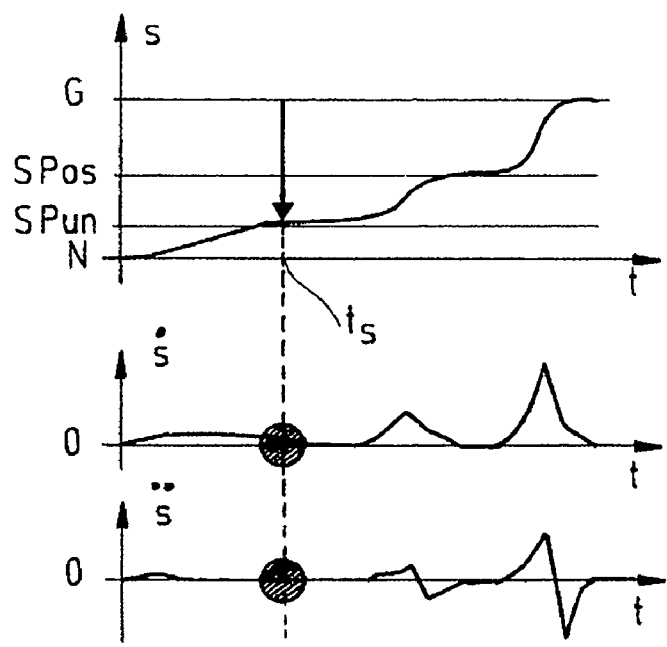
FIG. 2 shows diagrams intended to explain a first embodiment of the optimization method according to the invention for registering and adjusting the synchronization point of a clutch.

FIG. 2 shows diagrams intended to explain a first embodiment of the optimization method according to the invention for registering and adjusting the synchronization point of a clutch.

In the first embodiment of the optimization method according to the invention the synchronization point is registered through observation of the movement of the gearshift sleeve 46 (or of the gear-shifting member 50 or of the actuator output 52).

In FIG. 2 the displacement s of the gearshift sleeve 46 is plotted over the time. Also shown are the first derivative $\dot{s}$ of the displacement s over the time and the second derivative $\ddot{s}$ of the displacement s over the time.

In this embodiment of the optimization method the gearshift sleeve 46 of the target gear is moved slowly (with minimal force) in the direction of the gear. A speed differential speed exists over the target synchronization.

If the gearshift sleeve comes to rest whilst a speed differential still persists or the speed thereof becomes slower, the current position of the gearshift sleeve 46 corresponds to the area of the synchronization point SPun. The corresponding synchronization time is denoted by $t_s$.

The synchronization position SPos, that is to say that position of the gearshift sleeve in which speed matching with the target gear is achieved, is represented by SPos. G represents that position of the gearshift sleeve 46 in which the positive interlock is achieved and the gear is engaged. N represents the neutral point of the associated clutch.

In the diagram of the speed $\dot{s}$ of the gearshift sleeve 46 it can be seen that at the synchronization point SPun this speed diminishes from a relatively constant value. This is likewise observable in the diagram of the acceleration $\ddot{s}$.

The following measures are feasible, in order to superimpose a speed differential on the target synchronization:

Firstly the speed differential can be triggered by an intended gear shift and then follows as a consequence of the differing transmission ratio of the initial and the target gear, the gear shift inevitably taking place whilst in motion. The synchronization point can accordingly be detected in a normal gear shift while in motion.

Secondly, the speed differential can be produced via the clutch. For example, the clutch is capable of superimposing the speed of the drive motor (internal combustion engine, electric motor, gas turbine, ...) on the transmission input 22 and can therefore ensure a speed differential over the target synchronization, irrespective of whether or not the vehicle is in motion, that is to say even when stationary.

Thirdly, the speed differential can be superimposed via the initial gear. If the gearshift sleeve 46 of the target synchronization can be displaced independently of the gearshift sleeve of the initial gear (i.e. if the clutches of the initial gear and the target gear are not part of one clutch assembly), with the clutch opened a speed differential can be superimposed over the target synchronization through the gear engaged. It is merely necessary for any gear to be engaged and the car to be still in motion.

Figure 3:
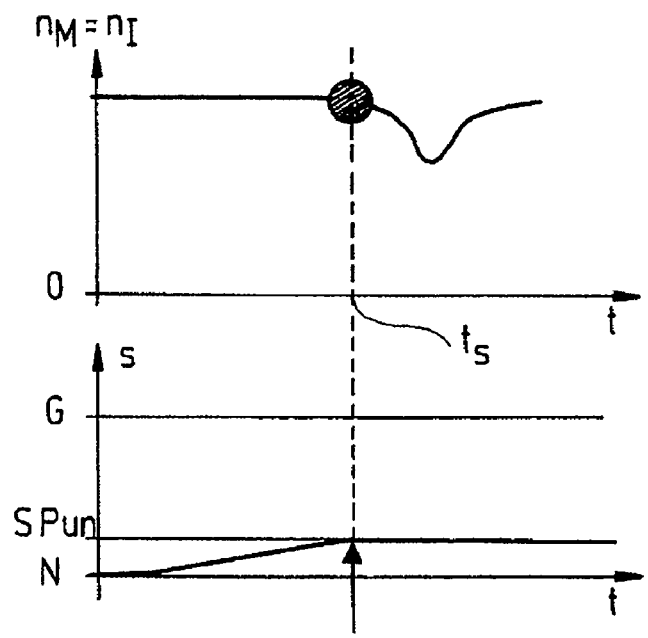
FIG. 3 shows diagrams intended to explain a second embodiment of the optimization method according to the invention for registering and adjusting the synchronization point.

FIG. 3 shows diagrams intended to explain a second embodiment of the optimization method according to the invention for registering and adjusting the synchronization point.

FIG. 3 shows the transmission input speed $n_I$ over the time t. In this embodiment the disconnect clutch 14 is closed, so that the transmission input speed $n_I$ is equal to the engine speed $n_M$.

FIG. 3 also shows the displacement s of the gearshift sleeve of the target gear over the time.

In the second embodiment the synchronization point can be detected whilst stationary. In this the case the clutch first has to be closed and the internal combustion engine, for example, has to be running at idling speed. There must be no gear engaged.

The gearshift sleeve 46 is now moved from neutral N towards the synchronization point SPun, as can be seen from the diagram in FIG. 3. On reaching the synchronization point a brief fall in the speed of the internal combustion engine is detected. The time $t_s$ of the fall in the speed of the internal combustion engine indicates the synchronization point SPun. This point can also be used to stop the gearshift sleeve 46, as can be seen from the diagram in FIG. 3 (since otherwise the gear would be engaged with the disconnect clutch 14 closed and the vehicle at a standstill, which would naturally lead to stalling of the engine or to damaging of the clutch).

The speed differential can here obviously also be produced by an electric motor, as is provided, for example, in hybrid vehicles, by a gas turbine, by a crank-shaft starter generator, etc.

Instead of detection via a gearshift sleeve position or the transmission input or engine speed, it is also possible to register the synchronization point through observation of the control variable of the actuator 52. In the case of a hydraulic operating cylinder the control variable may be the pressure, for example, and in the case of an electric motor the current.

Where there is a speed differential over the target gear, it is possible, on reaching the synchronization point SPun, to detect a brief variation in the control variable (such as a rise in the current or the pressure), depending on the type of regulator or control. This rise is a result of a variation in the transmission behaviour of the controlled system (traversing from neutral without resistance and pressure of the synchro rings).

Figure 4:
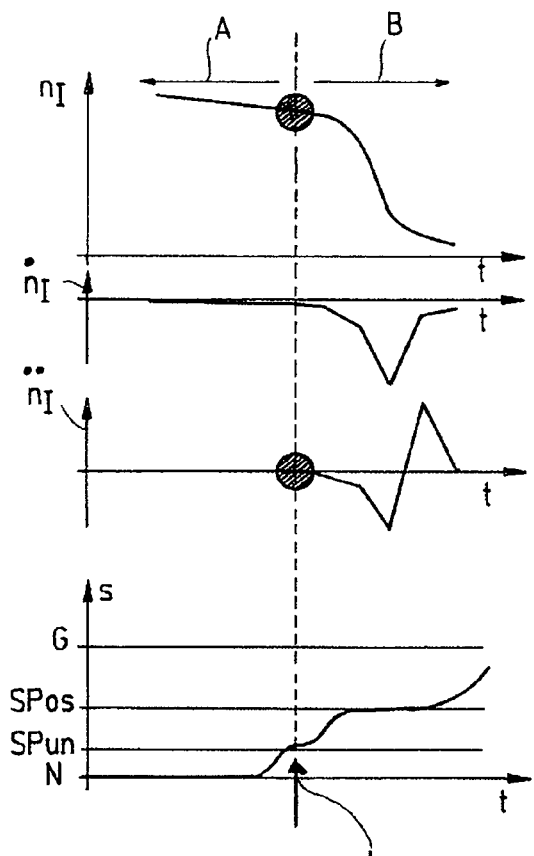
FIG. 4 shows diagrams intended to explain a third embodiment of the optimization method according to the invention for registering and adjusting the synchronization point in an upward gear shift.

FIG. 4 shows diagrams intended to explain a third embodiment of the optimization method according to the invention for registering and adjusting the synchronization point in an upward gear shift.

If a gear shift is performed whilst the motor vehicle is in motion, the transmission input speed $n_I$ must be adjusted from the speed level of the initial gear to that of the target gear. If the initial gear has been disengaged, the clutch is open and the synchronization point has not yet been reached, the transmission input speed $n_I$ is determined by the drag torque of the transmission (area A in FIG. 4).

Shown one above the other in FIG. 4 are the transmission input speed $n_I$ over the time in an upward gear shift, corresponding to the gradient $\dot{n}_I$ of the transmission input speed and the variation $\ddot{n}_I$ of the gradient of the transmission input speed over the time. Also shown in FIG. 4 is the displacement of the gearshift sleeve s over the time.

It will be seen from the diagrams in FIG. 4 that the speed gradient $\dot{n}_I$ becomes steeper on reaching the synchronization point SPun. The synchronization point SPun can in this case be determined via the variation $\ddot{n}$ in the gradient of the transmission input speed (that is to say the second derivative $\ddot{n}_I$ of the speed $n_I$).

Figure 5:
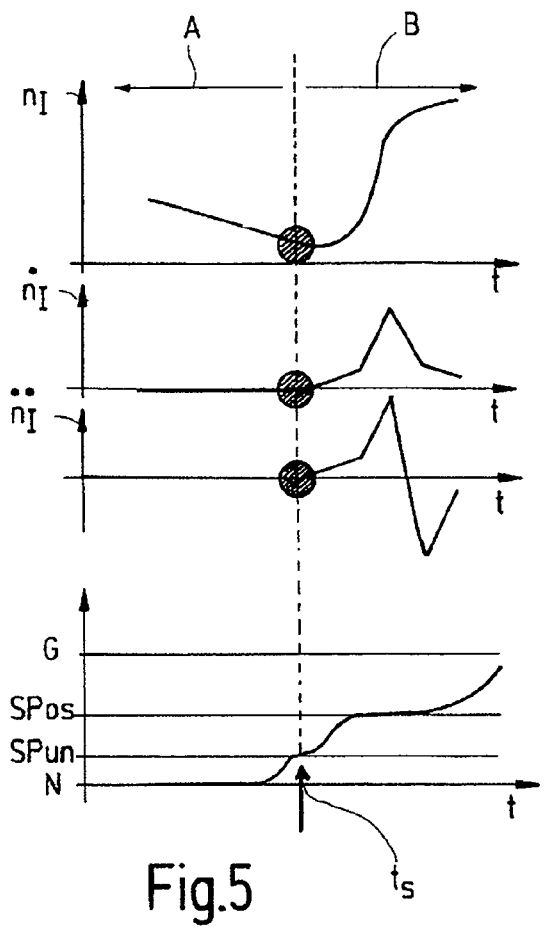
FIG. 5 shows a modification of the third embodiment when shifting down again.

FIG. 5 shows diagrams intended to explain a modification of the third embodiment of the optimization method according to the invention for registering and adjusting the synchronization point in a downward gear shift.

The basic operating principle is comparable to the sequences when shifting up.

In a downward gear shift the speed $n_I$ diminishes steadily after disengagement of the initial gear, until the speed ceases to drop on reaching the synchronization point SPun and begins to increase as the target speed is approached. In the process the sign of the speed gradient, that is to say the first derivative $\dot{n}_I$ of the transmission input speed $n_I$, changes from (−) to (+). However, the synchronization point SPun lies where the gradient of the transmission input speed changes in value, that is to say where the second derivative $\ddot{n}_I$ of the transmission input speed experiences a change in value.

In a third embodiment according to FIGS. 4 and 5 the speed differential of the transmission input speed $n_I$ and the transmission output speed $n_O$ can also be used instead of the transmission input speed $n_I$.

The aim of the embodiment of the optimization method according to the invention as hitherto described is an adaptive registering and storage of the synchronization point of the clutches of the step-variable transmission 16 over the service life of the motor vehicle. As shown, this can be done continuously, that is to say at each gear shift of the step-variable transmission, for example. Alternatively it is also possible to perform special steps in the method, for example when the vehicle is stationary (this may be done, for example in the context of servicing work or the like).

Through precise, continuous ("adaptive") registering of the synchronization point it is possible, when engaging the target gear, at any time during the service life of the motor vehicle, to run the gearshift sleeve 46 each time rapidly to a point just prior to the synchronization point and to switch to a slower gearshift sleeve movement shortly before reaching the synchronization point. This makes it possible to optimize the time taken for a gear shift.

It is furthermore possible, by logging the synchronization point over the service life of the motor vehicle, to register the wear to the respective synchromesh linings.

In addition or as an alternative to the optimization of the registering and adjustment of the synchronization point in accordance with the invention, it is also possible to register and adjust the optimum disengagement point of the initial gear.

Whereas in the prior art for safety reasons a gear is often reported as "disengaged" only with a relatively large displacement difference after the actual release of the positive interlock on the initial gear, in order to initiate further steps of the method in the context of a gear change, the disengagement point in the method explained below is continuously registered throughout the operating time. It is therefore possible to emit a "gear disengaged" message immediately (that is to say a very short distance after the actual release of the positive interlock), and hence to optimize still further the time taken for a gear shift.

Figure 6:
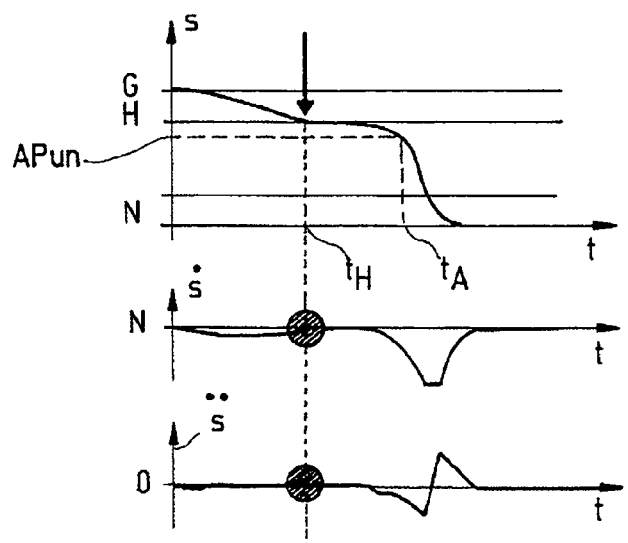
FIG. 6 shows diagrams intended to explain a fourth embodiment of the optimization method according to the invention for registering and adjusting a disengagement point.

FIG. 6 shows diagrams intended to explain a fourth embodiment of the optimization method according to the invention for registering and adjusting the disengagement point APun.

In FIG. 6 the disengagement point APun is registered and adjusted indirectly by registering the backing position H, that is to say on the basis of the gearshift sleeve movement.

The method in the fourth embodiment basically corresponds to the sequence in the first embodiment. The fourth embodiment can be performed irrespective of whether or not a gear shift is active. It is merely necessary for the initial gear (the gear engaged) to be under torque.

If the gearshift sleeve of the initial gear is now moved slowly (with minimal force) in the neutral N direction, it will come to rest against the backing owing to the torque acting over the engaged gear. Once determined, this backing position H forms the basis for calculation of the position of the disengagement point APun.

The fourth embodiment can obviously only be used when backings are actually provided on the toothings of the clutch of the initial gear, which is usually the case, however, in order to prevent accidental release of the gear engaged.

In the fourth embodiment it is assumed that a distance between a backing position H and the disengagement point APun is a fixed quantity.

The torque can be superimposed on the initial gear as follows:

Firstly, the torque can be superimposed via the disconnect clutch 14. This method of superimposing torque is not dependent on the type of transmission, nor does it depend on whether or not a gear shift is active. This method of superimposing torque is furthermore possible both when the car is stationary and when it is in motion.

Secondly, the torque can be superimposed via the target gear. When the gearshift sleeve of another gear can be moved independently of the gearshift sleeve of the initial gear, with the clutch opened it is possible, by superimposing a synchronizing torque on this other gear, to achieve a torque (a tension) over the initial gear.

Thirdly, a torque can furthermore be achieved through any other "torque source", for example through electric motors in the case of hybrid vehicles, through combinations of the first and second methods, etc.

The fourth embodiment can furthermore be modified by registering the control variable of the actuator of the initial gear instead of the gearshift sleeve position. Depending on the method of gearshift sleeve actuation, on reaching the backing H under torque a variation in the control variable (for example, an increase in a current of an electric motor or an increase in a pressure in a hydraulic cylinder) will be at least briefly detectable, according to the type of regulator/control. This increase occurs as a result of the variation in the transmission behaviour of the controlled system.

Figure 7:
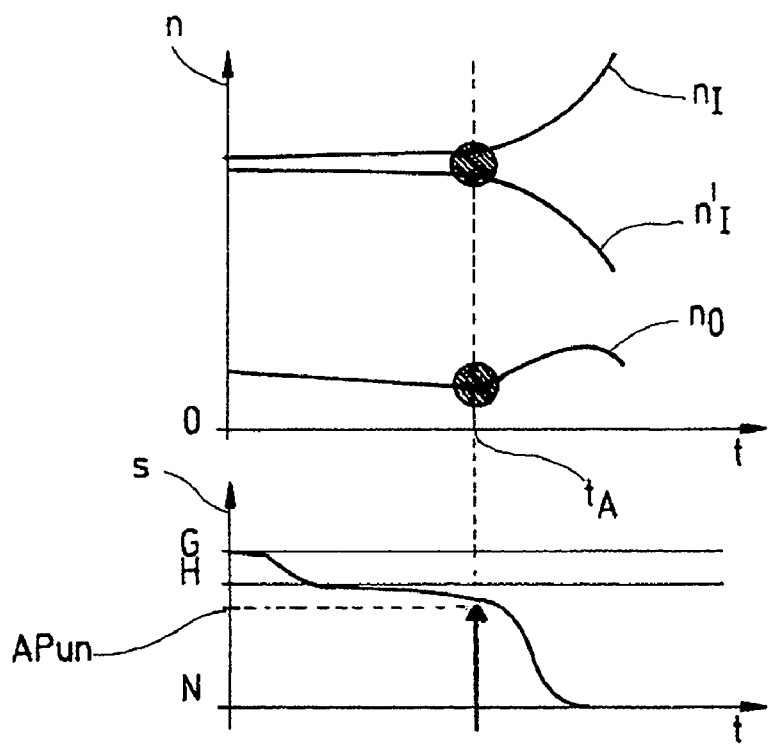
FIG. 7 shows diagrams intended to explain a fifth embodiment of the optimization method according to the invention for registering and adjusting the disengagement point.

FIG. 7 shows diagrams intended to explain a fifth embodiment of the optimization method according to the invention for registering and adjusting the disengagement point.

FIG. 7 shows, in outline, one possible way of detecting the disengagement point APun whilst in motion. In this case the initial gear (in the event of an intended gear shift, for example) is disengaged observing the transmission input and output speed and/or observing the speed of the internal combustion engine, it being essential for the initial gear to be under torque throughout the entire disengagement process. That is to say the initial gear, as in the fourth embodiment, must be under a torque, that is tensioned. If the positive interlock of the initial gear is now released, this results in a variation in at least one of the aforementioned speeds.

FIG. 7 accordingly represents the transmission input speed $n_I$ over the time (in a driving situation under traction or with an applied lower gear), the transmission input speed $n'_I$ over the time (for example with an applied or pressed higher gear) and the transmission output speed $n_O$ (for example in a driving situation under overrun conditions).

The torque can be superimposed on the initial gear as follows:

Firstly, the torque can be superimposed via the disconnect clutch 14. This method of superimposing torque is not dependent on the type of transmission, although it must be done whilst the car is in motion and is to be maintained until the initial gear is reported as disengaged.

Secondly, the torque can be superimposed via the target gear. If the gearshift sleeve of another gear can be moved independently of the gearshift sleeve of the initial gear engaged, with the clutch opened it is possible, by superimposing a synchronizing torque on this other gear, to achieve a torque (a tension) over the initial gear. In this embodiment, also, the transmission output must exhibit a rotational speed (the vehicle must be in motion).

Thirdly, the torque can be achieved through any other type of "torque generator", for example through an electric motor in the case of a hybrid vehicle, through a crankshaft starter generator, through a combination of the first and second methods, etc.

Figure 8:
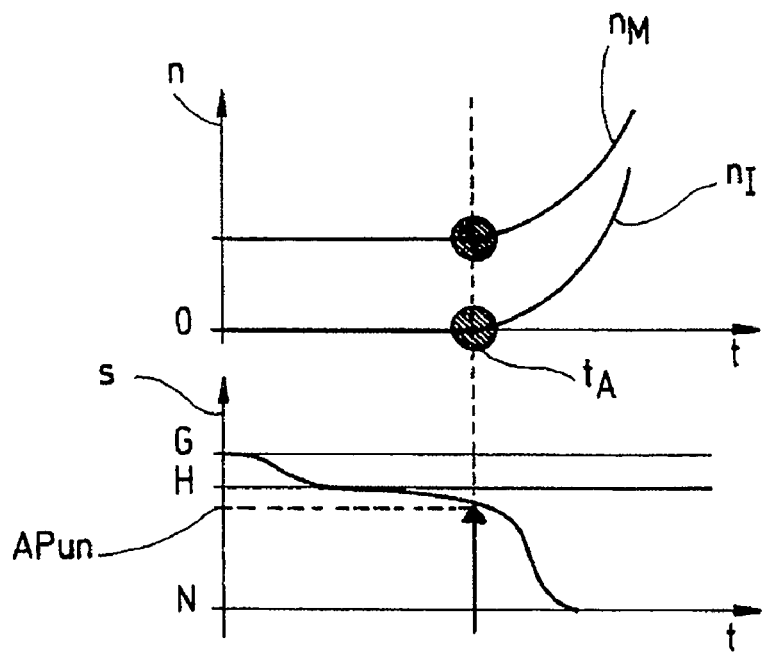
FIG. 8 shows diagrams intended to explain a sixth embodiment of the optimization method according to the invention for registering and adjusting the disengagement point.

FIG. 8 shows diagrams intended to explain a sixth embodiment of the optimization method according to the invention for registering and adjusting the disengagement point APun.

In this case the disengagement point is registered with the vehicle stationary, for example at the end of the conveyor belt of the vehicle manufacturer.

In the sixth embodiment, with the footbrake depressed and a transmission input torque superimposed through the clutch, the gearshift sleeve of the initial gear engaged is moved slowly towards the neutral position until the positive interlock of the initial gear to be disengaged is released and the transmission input speed picks up or any speed at all is measurable. Like the speed on the transmission input, the speed of the internal combustion engine also increases (owing to the slipping clutch).

Accordingly FIG. 8 represents the speed $n_M$ of the internal combustion engine and the transmission input speed $n_I$ over the time. The disengagement point APun is registered in the event of a variation in one of these speeds.

In a modification of the sixth embodiment the disengagement point APun can also be registered through observation of the control variable of the actuator 52 rather than a variation in the speeds $n_M$ and/or $n_I$.

That is to say, if the gear is disengaged under load, it will be possible to detect a variation in the control variable (such as a fall in the current of an electric motor or a fall in the pressure of a hydraulic operating cylinder). This fall is a result of a change in the transmission behaviour of the controlled system of the gear to be disengaged under torque.

The various embodiments for registering and adjusting the synchronization point can obviously also be combined with one another. The various embodiments for registering and adjusting the disengagement point can likewise be combined with one another.

It furthermore goes without saying that the values for the synchronization point SPun and the disengagement point APun can in each case be stored in a control unit and used for optimum timing and safe activation of the associated actuator 52. The various optimization methods are consequently stored in a control unit, as represented schematically by 60 in FIG. 1.

Overall, this results in optimum timing and comfort of the gear-shifting sequences of automated shift transmissions (or other types of step-variable transmissions such as dual-clutch transmissions) over the entire service life. Reproducible gear-shifts are possible in the same driving situation (from gear shift to gear shift and from vehicle to vehicle). A further result is increased safety due the account taken of wear to transmission components.

What is claimed is:

1. A method for optimizing the gear-shifting sequence in a step-variable transmission fitted in a motor vehicle, which has a plurality of gears, which can be engaged and disengaged by means of respective clutches, the method comprising the following steps:
   registering at least one of a tolerance-dependent and a wear-dependent parameter of a clutch of the step-variable transmission,
   adjustment of a set-point displacement value of a gear-shifting member of the clutch, which corresponds to the parameter and which is approached in the course of a gear shift, as a function of the value of the parameter registered, wherein the parameter is registered by moving the gear-shifting member and by registering the second derivative of an input speed of the step-variable transmission.

2. The method according to claim 1, wherein the clutch is a synchronizer clutch and that the parameter is the synchronization point when engaging a gear.

3. The method according to claim 1, wherein the parameter is always reregistered throughout the service life of the motor vehicle, in order to readjust the set-point displacement value.

4. The method according to claim 1, wherein the parameter is registered while the vehicle is in motion.

5. A method for optimizing the gear-shifting sequence in a step-variable transmission fitted in a motor vehicle, which has a plurality of gears which can be engaged and disengaged by means of respective synchronizer clutches, the method comprising the following steps:
   registering a disengagement point of a gear-shifting member during disengagement of an initial gear, and initiating the engagement of a target gear;
   actuating the synchronizer clutch of the target gear so that a displacement target value shortly before the synchronization point is achieved;
   further actuation of the synchronizer clutch of the target gear in order to perform synchronization at the target gear;
   wherein a synchronization point of the synchronizer clutch is registered while the vehicle is in motion, the synchronization point being at least one of a tolerance-dependent and a wear-dependent parameter, wherein the synchronization point is registered during actuation of the synchronizer clutch of the target gear by registering the second derivative of an input speed of the step-variable transmission and by evaluating changes thereof; and wherein the displacement target value of the gear-shifting member of the synchronizer clutch, which corresponds to the registered synchronization point, is adjusted in dependence of the registered synchronization point while the vehicle is in motion.

* * * * *

UNITED STATES PATENT AND TRADEMARK OFFICE
CERTIFICATE OF CORRECTION

PATENT NO. : 7,632,213 B2
APPLICATION NO. : 11/541795
DATED : December 15, 2009
INVENTOR(S) : Disch-Simon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 175 days.

Signed and Sealed this

Twenty-first Day of December, 2010

David J. Kappos
*Director of the United States Patent and Trademark Office*